United States Patent
Mitsushima et al.

(10) Patent No.: US 11,035,045 B2
(45) Date of Patent: Jun. 15, 2021

(54) APPARATUS FOR PRODUCING ORGANIC HYDRIDE AND METHOD FOR PRODUCING ORGANIC HYDRIDE USING SAME

(71) Applicants: NATIONAL UNIVERSITY CORPORATION YOKOHAMA NATIONAL UNIVERSITY, Yokohama (JP); DE NORA PERMELEC LTD., Fujisawa (JP)

(72) Inventors: Shigenori Mitsushima, Yokohama (JP); Yasutomo Takakuwa, Yokohama (JP); Yoshinori Nishiki, Fujisawa (JP); Akihiro Kato, Fujisawa (JP); Akiyoshi Manabe, Fujisawa (JP)

(73) Assignees: NATIONAL UNIVERSITY CORPORATION YOKOHAMA NATIONAL UNIVERSITY, Yokohama (JP); DE NORA PERMELEC LTD., Fujisawa (JP)

( * ) Notice: Subject to any disclaimer, the term of this patent is extended or adjusted under 35 U.S.C. 154(b) by 140 days.

(21) Appl. No.: 15/528,438

(22) PCT Filed: Nov. 19, 2015

(86) PCT No.: PCT/JP2015/082616
§ 371 (c)(1),
(2) Date: May 19, 2017

(87) PCT Pub. No.: WO2016/080505
PCT Pub. Date: May 26, 2016

(65) Prior Publication Data
US 2017/0314145 A1    Nov. 2, 2017

(30) Foreign Application Priority Data
Nov. 21, 2014    (JP) .............................. JP2014-236772

(51) Int. Cl.
*C25B 3/25* (2021.01)
*C25B 9/23* (2021.01)
(Continued)

(52) U.S. Cl.
CPC ................. *C25B 3/25* (2021.01); *C25B 1/04* (2013.01); *C25B 9/23* (2021.01); *C25B 9/73* (2021.01);
(Continued)

(58) Field of Classification Search
None
See application file for complete search history.

(56) References Cited

U.S. PATENT DOCUMENTS 4,247,376 A * 1/1981 Dempsey .................. C25B 1/26
                                                                  204/258
6,802,875 B1   10/2004 Kimbara et al.
(Continued)

FOREIGN PATENT DOCUMENTS

CN        1403630 A     3/2003
CN      101333667 A    12/2008
(Continued)

OTHER PUBLICATIONS

"All of solid polymer electrolyte fuel cells", Electrons and Ions Functional Chemistry Series, vol. 4, 2003, 7 pages.
(Continued)

*Primary Examiner* — Harry D Wilkins, III
(74) *Attorney, Agent, or Firm* — Birch, Stewart, Kolasch & Birch, LLP

(57) ABSTRACT

An organic hydride production apparatus that enables the reduction reaction at the cathode of an organic compound having an unsaturated bond to proceed at high current efficiency and at a low electric power consumption rate, and a method for producing an organic hydride that uses this
(Continued)

production apparatus. The production apparatus includes a solid polymer electrolyte membrane having proton conductivity, a cathode which is provided on one surface of the solid polymer electrolyte membrane and generates a hydride by reducing a substance to be hydrogenated, a cathode chamber which houses the cathode and is supplied with the substance to be hydrogenated, an electrode catalyst-containing anode which is provided on the other surface of the solid polymer electrolyte membrane and generates protons by oxidizing water, and an anode chamber which houses the anode and is supplied with an electrolytic solution, wherein the substance to be hydrogenated is supplied from the lower end of the cathode chamber, the production apparatus has a hydride outlet through which the product and the like is discharged from the upper end of the cathode chamber, and at least one partition with a width of not less than 0.1 mm is formed inside the cathode camber.

3 Claims, 6 Drawing Sheets

(51) Int. Cl.
    *C25B 9/73*           (2021.01)
    *C25B 11/03*        (2021.01)
    *C25B 1/04*          (2021.01)
    *C25B 13/08*        (2006.01)

(52) U.S. Cl.
    CPC .............. *C25B 11/03* (2013.01); *C25B 13/08* (2013.01); *Y02E 60/36* (2013.01)

(56) References Cited

U.S. PATENT DOCUMENTS

| | | |
|---|---|---|
| 2008/0234527 A1 | 9/2008 | Matsumoto et al. |
| 2009/0000574 A1 | 1/2009 | Sugimasa et al. |
| 2009/0025291 A1 | 1/2009 | Ichikawa et al. |
| 2009/0308738 A1* | 12/2009 | Richards ............... C25B 1/12 204/252 |
| 2012/0321549 A1 | 12/2012 | Okada et al. |
| 2013/0087451 A1* | 4/2013 | Hirashige ............... C25B 3/25 204/265 |
| 2013/0162997 A1 | 6/2013 | Kast et al. |
| 2013/0313127 A1 | 11/2013 | Sato et al. |
| 2014/0110268 A1 | 4/2014 | Jackson et al. |
| 2014/0144774 A1* | 5/2014 | Hirashige ............... C25B 3/25 204/252 |
| 2014/0326610 A1 | 11/2014 | Sato et al. |
| 2015/0008139 A1 | 1/2015 | Saffron et al. |
| 2015/0114830 A1* | 4/2015 | Asaumi .................. C25B 9/02 204/252 |
| 2017/0130344 A1* | 5/2017 | Mitsushima ........... C07C 5/10 |
| 2017/0292198 A1* | 10/2017 | Mitsushima ........ C25B 11/0442 |

FOREIGN PATENT DOCUMENTS

| | | | |
|---|---|---|---|
| CN | 103069051 A | 4/2013 | |
| EP | 3124651 A1 | 2/2017 | |
| EP | 3199665 A1 | 8/2017 | |
| JP | 8-246177 A | 9/1996 | |
| JP | 2011-2007641 A | 10/2011 | |
| JP | 4907210 B2 | 3/2012 | |
| JP | 2012-72477 A | 4/2012 | |
| WO | WO 2012/091128 A1 | 7/2012 | |
| WO | WO 2013/111585 A1 | 8/2013 | |
| WO | WO 2013/134220 A1 | 9/2013 | |
| WO | WO 2015/146944 A1 * | 10/2015 | ............... C25B 9/00 |
| WO | WO 2015/146944 A1 | 10/2015 | |
| WO | WO 2016/047629 A1 * | 3/2016 | ............... C25B 9/00 |

OTHER PUBLICATIONS

"Soda Technology Handbook", Japan Soda Industry Association, 2009, 64 pages.
International Search Report for PCT/JP2015/082616 (PCT/ISA/210) dated Dec. 28, 2015.
Shigematsu, "Redox Flow Battery for Energy Storage," Sumitomo Electric Industries SEI Technical Review, No. 179, 2011, pp. 7-16.
Written Opinion of the International Searching Authority for PCT/JP2015/082616 (PCT/ISA/237) dated Dec. 28, 2015.

* cited by examiner

US 11,035,045 B2

APPARATUS FOR PRODUCING ORGANIC HYDRIDE AND METHOD FOR PRODUCING ORGANIC HYDRIDE USING SAME

TECHNICAL FIELD

The present invention relates to an organic hydride production apparatus and a method for producing an organic hydride using the production apparatus (hereafter also referred to as simply an "electrolytic cell" and a "production method"), and relates more specifically to an organic hydride production apparatus that enables the reduction reaction at the cathode of an organic compound having an unsaturated bond to proceed at high current efficiency and at a low electric power consumption rate, and a method for producing an organic hydride that uses this production apparatus.

BACKGROUND ART

Electrical power consumption in Japan is about 1,000 TWh per year, and because thermal power generation is currently also being used to replace the power previously generated by nuclear power generation, the proportion of power generated by thermal power generation has reached 90%. On the other hand, although it is desirable that renewable energy sources such as solar power, wind power, hydropower and geothermal power generation are used more widely as new energy sources capable of suppressing carbon dioxide emissions, the amount of power generated from these sources currently represents only about 1% of total power generation. Although Japan is blessed with water resources, it cannot be claimed to be an ideal location for solar power or wind power, and is therefore currently forced to rely on the transport and storage of energy sources from overseas. Further, although consideration is being given to the use of wind power generation and large-scale solar power generation to alleviate short-period output fluctuations, applying these sources to the alleviation of medium-term output fluctuations or large-scale energy transport is problematic. Accordingly, it is thought that converting the electrical power from these renewable energy sources to chemical energy may be effective. Processes for converting electrical power directly into chemical energy are electrochemical systems, and secondary cells or so-called accumulators are devices for converting electrical power to chemical energy and then storing that energy, and are widely used.

One example of a promising system based on renewable energy is a system in which large-scale solar power generation or wind power generation systems are established in appropriate locations throughout the world, and the generated energy is converted to an energy carrier, which can then be transported to enable the energy to be consumed domestically. Examples of possible energy carriers include liquid hydrogen, ammonia and organic hydrides. However, because hydrogen is a gas at normal temperature and normal pressure, it suffers from the drawback of requiring special tankers for transport and storage. In light of these circumstances, organic hydrides that use a hydrocarbon such as cyclohexane, methylcyclohexane or decalin are attracting considerable attention as alternatives to transporting and storing hydrogen.

Selecting a liquid having similar properties to petroleum as the organic hydride has the advantages of offering superior compatibility with comparatively large-scale systems, and enabling easier distribution to energy system terminals. In other words, these organic hydrides are liquid at normal temperature and normal pressure, and are easy to handle, and because the organic hydrides can be hydrogenated and dehydrogenated electrochemically, they can be stored and transported as an energy carrier instead of hydrogen.

Conventionally, the production of organic hydrides such as methylcyclohexane has employed a chemical method in which renewable energy is used to produce hydrogen by water electrolysis, and toluene is then subjected to hydrogen addition in a hydrogenation reactor and converted to methylcyclohexane (for example, see Patent Documents 1 and 2). In contrast, electrolytic synthesis methods enable direct hydrogen addition electrochemically, enabling the process to be simplified. Further, electrolytic synthesis methods suffer minimal efficiency loss regardless of scale, and exhibit excellent adaptability to start-stop operations. Moreover, at comparatively small-scale renewable energy locations, where systems that include high-temperature processes tend to be more likely to suffer from reduced efficiency, superior energy conversion can be achieved, particularly from an efficiency perspective, and the energy can then be loaded into the organic hydride energy storage and transport network.

Much investigation has already been conducted into technology that uses these types of organic hydrides. For example, Patent Document 3 proposes an electrolytic cell that reduces an organic compound having an unsaturated bond. Further, Patent Documents 4 and 5 propose devices for producing hydrogen from an organic compound using a membrane separation apparatus. Moreover, Patent Document 6 proposes a device for producing hydrogen from an organic compound and supplying the hydrogen to a fuel cell. Furthermore, Patent Documents 7 and 8 propose methods for the electrolytic oxidation and reduction of organic compounds.

However, a large-scale electrolytic cell for producing an organic hydride, which uses a liquid organic compound such as toluene as a raw material, and electrolyzes this raw material to obtain another liquid organic compound has yet to be implemented in a practical application, and structures for electrodes and conductive cathode supports that enable the raw material to be supplied smoothly to the electrode surface and the product to be removed from the surface are not yet known. In the common brine electrolysis industry, by subjecting sodium chloride to electrolysis in a two-chamber electrolytic cell having an ion exchange membrane, chlorine gas, sodium hydroxide and hydrogen are produced simultaneously. The technology disclosed in Non-Patent Document 1 relating to common brine electrolysis can be easily applied to the production of organic hydrides, but because fundamentally no gas is generated in the organic hydride production process, the electrodes and support structures used for common brine electrolysis cannot be used without modification.

Further, in a low-temperature fuel cell, an ion exchange membrane and electrodes are assembled together, and hydrogen and oxygen are supplied as raw materials to obtain electrical power (Non-Patent Document 2). It is presumed that the cell structure of a low-temperature fuel cell could also be applied to an organic hydride electrolytic cell. However, because the electrodes and the supports have been optimized to enable the supply of large amounts of gas raw materials, modifications would be required to enable the circulation of liquids. Furthermore, other problems also arise in relation to applying the technology to organic hydride electrolytic cells due to the requirement for larger cells. Moreover, redox cells using vanadium ions have been used in commercialized large-scale practical devices, and the materials used in these devices hold promise for use in organic hydride production apparatus (Non-Patent Document 3). However, although porous materials having a large contact area have enabled the current value for electrodes to be increased, the current density for redox cells is limited to not more than 0.05 A/cm$^2$, which does not satisfy the conditions required for the electrolytic cell of an organic hydride production apparatus.

CITATION LIST

Patent Documents

Patent Document 1: Japanese Unexamined Patent Application No. 2011-207641
Patent Document 2: Japanese Patent No. 4,907,210
Patent Document 3: International Patent Application No. 2012/091128
Patent Document 4: U.S. Patent Application No. 2008/234527
Patent Document 5: U.S. Patent Application No. 2009/025291
Patent Document 6: U.S. Pat. No. 6,802,875
Patent Document 7: U.S. Patent Application No. 2014/110268
Patent Document 8: International Patent Application No. 2013/134220

Non-Patent Documents

Non-Patent Document 1: Soda Handbook 2009, Japan Soda Industry Association, p. 27 and the like
Non-Patent Document 2: Electrons and Ions Functional Chemistry Series, Vol. 4, All About Solid Polymer Fuel Cells, NTS Inc., p. 150 and the like
Non-Patent Document 3: Sumitomo Electric Industries SEI Technical Review, No. 179, July 2011, Redox Flow Batteries for Electric Power Storage

SUMMARY OF INVENTION

Technical Problem

In the production of organic hydrides, one example of the reduction reaction of an organic compound having an unsaturated bond is the reaction that uses toluene (TL) as a raw material, and synthesizes methylcyclohexane (MCH) by a reduction process represented by the following equations.

Cathode Reaction:

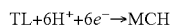

Anode Reaction:

Overall Reaction:

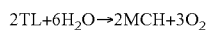

In the electrolytic production of organic hydrides, an electrolyte membrane is used to completely separate the anode chamber liquid composed of an aqueous solution and the cathode chamber liquid composed of an organic compound. For the anode chamber, the type of anode structure developed for common brine electrolysis can be used. In contrast, for the cathode chamber, a structure is required that is capable of rapidly and uniformly supplying the liquid raw material and discharging the liquid product. In order to enable a liquid organic compound such as toluene to be used as the raw material, and a liquid organic compound to be produced efficiently by electrolysis of this raw material, the raw material must be supplied smoothly to the electrode surface, and the product must then be removed efficiently from the surface. If these requirements are not addressed, then localized supply of the raw material, an inability to satisfactorily remove the product, and a lack of uniformity in the current may occur, and hydrogen may be generated as a result of secondary reactions, hindering the targeted reduction of the unsaturated organic substance at the cathode, and causing voltage loss.

Accordingly, an object of the present invention is to provide an organic hydride production apparatus that enables the reduction reaction at the cathode of an organic compound having an unsaturated bond to proceed at high current efficiency and at a low electric power consumption rate, and a method for producing an organic hydride that uses this production apparatus.

Solution to Problem

As a result of intensive investigation aimed at addressing the issues described above, the inventors of the present invention discovered that by using a specific structure inside the cathode chamber, the above object could be achieved, enabling them to complete the present invention.

In other words, an organic hydride production apparatus of the present invention includes a solid polymer electrolyte membrane having proton conductivity, a porous cathode which is provided on one surface of the solid polymer electrolyte membrane and generates a hydride by reducing a substance to be hydrogenated, a cathode chamber which houses the porous cathode and is supplied with the substance to be hydrogenated, an electrode catalyst-containing anode which is provided on the other surface of the solid polymer electrolyte membrane and generates protons by oxidizing water, and an anode chamber which houses the anode and is supplied with an electrolytic solution, wherein
the substance to be hydrogenated is supplied from the lower end of the cathode chamber, the production apparatus has a hydride outlet through which a product, unreacted material of the substance to be hydrogenated and by-product hydrogen are discharged from the upper end of the cathode chamber, and at least one partition with a width of not less than 0.1 mm is formed inside the cathode camber.

In the organic hydride production apparatus of the present invention, it is preferable that the partition is formed in at least the upper portion of the cathode chamber, and the area of the portion having the partition is not more than 20% of the effective projected electrode area.

A method for producing an organic hydride according to the present invention is a method for producing an organic hydride using an organic hydride production apparatus of the present invention includes a solid polymer electrolyte membrane having proton conductivity, a porous cathode which is provided on one surface of the solid polymer electrolyte membrane and generates a hydride by reducing a substance to be hydrogenated, a cathode chamber which houses the porous cathode and is supplied with the substance to be hydrogenated, an electrode catalyst-containing anode which is provided on the other surface of the solid polymer electrolyte membrane and generates protons by oxidizing water, and an anode chamber which houses the anode and is supplied with an electrolytic solution, wherein
the method includes supplying the substance to be hydrogenated from the lower end of the cathode chamber, and discharging a product, unreacted material of the substance to be hydrogenated and by-product hydrogen from the upper end of the cathode chamber.

In the method for producing an organic hydride according to the present invention, when the substance to be hydrogenated is supplied to the organic hydride production apparatus at a rated flow rate, if the pressure difference in the substance to be hydrogenated between two points at the lower end of the cathode is deemed $\Delta P_L$, and the pressure difference in the mixture of the substance to be hydrogenated and the product between two points at the upper end of the cathode is deemed $\Delta P_H$, then it is preferable that the relationship represented by the following formula is satisfied.

$$\Delta P_L \leq \Delta P_H / 10.$$

Further, in the method for producing an organic hydride according to the present invention, when the substance to be hydrogenated is supplied at a rated flow rate, the pressure difference in the mixture of the substance to be hydrogenated and the product inside the cathode chamber is preferably not less than 1 kPa/mm.

Effects of Invention

By employing the present invention, hydrogen gas having a low specific gravity can be discharged from the upper portion of the electrolytic cell, and therefore accumulation of by-product hydrogen gas inside the electrolytic cell can be prevented. Further, by providing partitions with appropriate spacing orthogonal to the flow channel on the porous cathode of the organic hydride production apparatus, the substance to be hydrogenated supplied from the lower portion of the electrolytic cell can be supplied uniformly to the cathode inside the cell, thus ensuring that the raw material permeates reliably inside the porous cathode and undergoes reaction. Without the partitions, liquid substitution inside the cathode occurs less readily, thus inhibiting the target reaction. Moreover, by providing the partitions, current concentration can be prevented, and the organic compound having an unsaturated bond can be reduced even at high current. As a result, the reduction reaction of the organic compound having an unsaturated bond at the cathode can proceed at high current efficiency and at a low electric power consumption rate.

DESCRIPTION OF EMBODIMENTS

Embodiments of the present invention are described below in further detail using the drawings.

Figure 1:
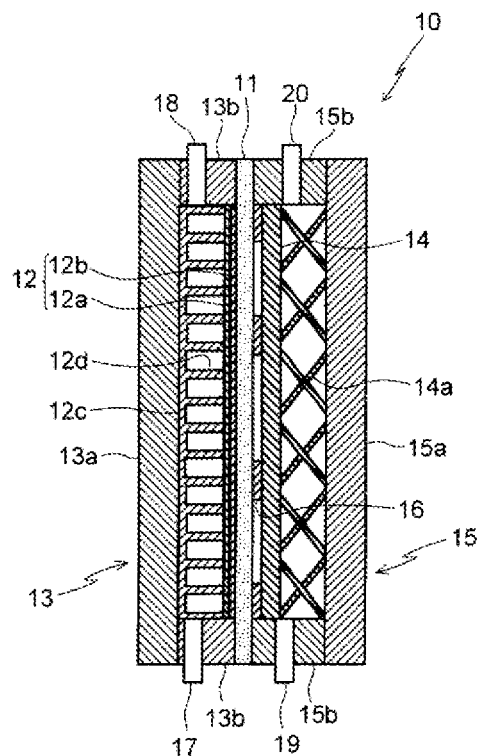
FIG. 1 is a schematic structural view of an organic hydride production apparatus according to a preferred embodiment of the present invention.

FIG. 1 is a schematic structural view of an organic hydride production apparatus (electrolytic cell) according to a preferred embodiment of the present invention. The electrolytic cell 10 of the present invention includes a solid polymer electrolyte membrane (hereafter also abbreviated as "the electrolyte membrane") 11 that has proton conductivity, a cathode 12 which is provided on one surface of the electrolyte membrane 11 and reduces the raw material substance to be hydrogenated to produce a hydride, a cathode chamber 13 which houses the cathode 12 and is supplied with the substance to be hydrogenated, an electrode catalyst-containing anode 14 (hereafter also referred to as simply "the anode") which is provided on the other surface of the electrolyte membrane 11 and oxidizes water to produce protons, and an anode chamber 15 which houses the anode 14 and is supplied with an electrolytic solution. In the example illustrated in the drawing, the cathode 12 is composed of a cathode substrate 12a formed from a porous conductive material and a cathode catalyst layer 12b formed on the surface of the cathode substrate.

Further, in the illustrated example, the cathode chamber 13 is formed from an outermost partition plate 13a and a spacer 13b positioned between the peripheral rim of this partition plate 13a and the electrolyte membrane 11. Further, the anode chamber 15 is formed from an outermost partition plate 15a and a spacer 15b positioned between the peripheral rim of this partition plate 15a and the electrolyte membrane 11. Moreover, an anode-supporting elastic body 14a is disposed between the partition plate 15a and the anode 14, and an anode spacer 16 is disposed between the anode 14 and the electrolyte membrane 11. The structure of the electrolytic cell of the present invention is described below in further detail.

[Cathode Chamber]

The organic hydride production apparatus of the present invention supplies the substance to be hydrogenated from the lower end of the cathode chamber 13, and has a hydride outlet 18 through which the product, unreacted material of the substance to be hydrogenated and by-product hydrogen are discharged from the upper end of the cathode chamber 13. In the illustrated example, an inlet 17 for the substance to be hydrogenated is provided in the lower end of the cathode chamber 13, and the hydride outlet 18 is provided in the upper end, whereas in the anode chamber 15, an acidic electrolytic solution inlet 19 is provided in the lower end of the chamber, and an acidic electrolytic solution outlet 20 is provided in the upper end. If the hydrogenation reaction rate of the raw material substance to be hydrogenated is increased, then the concentration of the substance to be hydrogenated falls to a low value in the vicinity of the outlet from the electrolytic cell 10. At this time, if the supply of the substance to be hydrogenated to the cathode 12 is insufficient, then hydrogen is generated by a secondary reaction. This generation of hydrogen is a phenomenon that is best avoided in organic hydride electrolysis systems, and particularly in those cases where progression of the electrolysis of the substance to be hydrogenated leads to a fall in the concentration of the substance to be hydrogenated, attempting to achieve the rated current density tends to cause localized hydrogen production. Accordingly, in order to prevent the accumulation of hydrogen gas inside the cathode chamber 13, it is preferable that the hydrogen gas, which has a low specific gravity, is discharged from the upper portion of the cathode chamber 13, and in order to promote this discharge, the electrolytic cell 10 of the present invention has a structure that enables liquids to flow from the lower portion of the cathode chamber 13 toward the upper portion.

Figure 2:
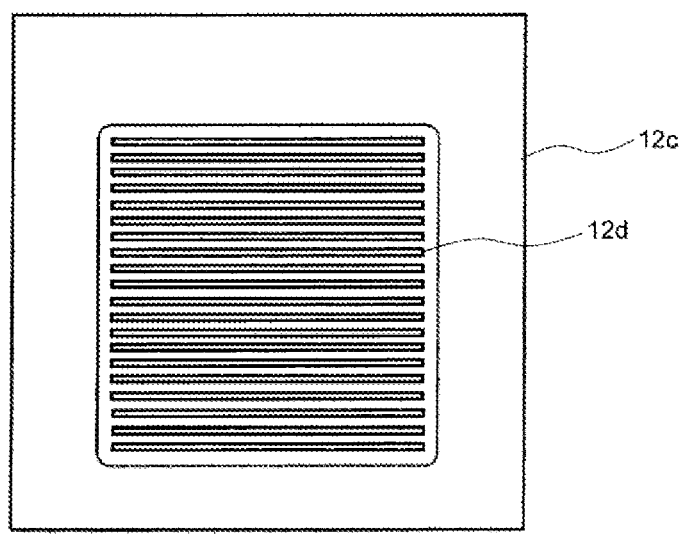
FIG. 2 is a schematic plan view of the cathode support for an organic hydride production apparatus according to a preferred embodiment of the present invention.
Figure 3:
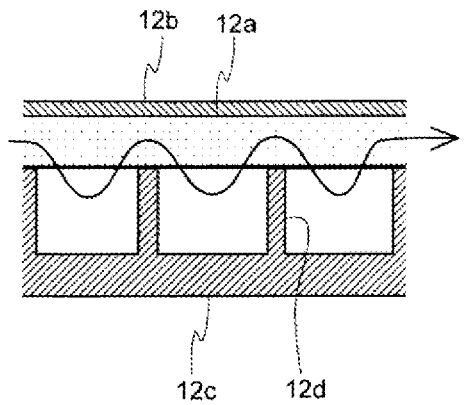
FIG. 3 is a schematic partial cross-sectional view of the cathode chamber of an organic hydride production apparatus according to a preferred embodiment of the present invention.

In the example illustrated in FIG. 1, a cathode support 12c is interposed between the cathode 12 and the partition plate 13a, and partitions 12d are provided on this cathode support 12c. FIG. 2 illustrates a schematic plan view of the cathode support for an organic hydride production apparatus according to a preferred embodiment of the present invention, and FIG. 3 illustrates a schematic partial cross-sectional view of the cathode chamber of an organic hydride production apparatus according to a preferred embodiment of the present invention. The arrow in FIG. 3 indicates the flow of the raw material substance to be hydrogenated. In the organic hydride production apparatus of the present invention, in order to ensure that the substance to be hydrogenated that is supplied from the lower portion of the electrolytic cell 10 passes through the cathode substrate 12a formed from the porous conductive material and is supplied uniformly to the cathode catalyst layer 12b inside the electrolytic cell 10, horizontal partitions 12d are provided with appropriate spacing, as illustrated in FIGS. 2 and 3.

By providing the partitions 12d, the raw material substance to be hydrogenated permeates reliably into the porous conductive material of the cathode substrate 12a, and therefore the reaction proceeds satisfactorily even when a high current density is used, and hydrogen generation can be suppressed. Further, by providing at least one partition 12d on the cathode support 12c, current concentration can be prevented, and the substance to be hydrogenated can be reduced even at high current. As a result, the reduction reaction of the substance to be hydrogenated at the cathode 12 is able to proceed at high current efficiency and at a low electric power consumption rate. In the example illustrated in the drawings, the partitions 12d are exposed to a pressing force from the anode-supporting elastic body 14a, thus ensuring good electron conductivity between the partitions 12d and the cathode 12.

To achieve a flow structure that improves mass transfer of the substance to be hydrogenated at low concentration, the partitions 12d are preferably provided orthogonal to the flow channel at a pitch of 1 to 5 mm and with a width of 0.1 to 1 mm. Although the pressure difference between the inlet of the substance to be hydrogenated and the outlet increases, it is thought that because the liquid flow occurs closer to the cathode catalyst layer 12b, the concentration gradient increases, thereby promoting mass transfer inside the cathode substrate 12a. A width of not less than 0.1 mm is effective as the partition 12d. By ensuring that the width of each partition 12d is not less than 0.1 mm, the pressure difference generated during liquid flow can easily be set to 1 kPa/mm or higher. If the thickness of each partition 12d is less than 0.1 mm, then the contribution to mass transfer diminishes, and the structure becomes more complex and difficult to produce. By adjusting the thickness of the cathode substrate 12a portion that also functions as the liquid flow channel to a value of 0.5 to 5 mm, a structure with little pressure loss can be designed.

In the electrolytic cell 10 of the present invention, the concentration of the substance to be hydrogenated in the cathode chamber 13 is lower at the hydride outlet 18 than at the inlet 17 for the substance to be hydrogenated. In a state where the substance to be hydrogenated is introduced into the cathode chamber 13 at an insufficient flow rate and with no agitation, the mass transfer tends to slow, and the concentration of the hydride becomes much higher at the cathode surface than within the middle of the solution, resulting in the generation of hydrogen by secondary reactions. If the electrolytic cell 10 is produced as a large-scale apparatus, then in order to ensure a reliably uniform flow of the liquid, it is preferable that a pressure loss exists between the lower portion and the upper portion of the cathode chamber 13.

Figure 4:
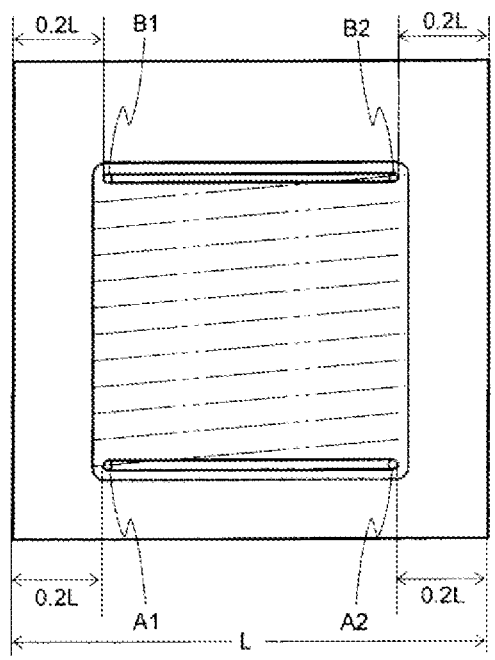
FIG. 4 is a schematic conceptual view of the pressure distribution inside an organic hydride production apparatus according to a preferred embodiment of the present invention.

FIG. 4 is a schematic conceptual view of the pressure distribution inside the electrolytic cell, and the two-dot chain lines in the drawing represent pressure contour lines. As illustrated in the drawing, in those cases where a uniform flow exists from the bottom portion toward the upper portion of the cathode chamber 13, it is preferable that the value of the pressure difference in the substance to be hydrogenated between two arbitrary points at the lower end of the cathode 12, for example if the width of the cathode support 12c in the illustrated example is deemed L, then the value of the pressure difference $\Delta P_L$ in the substance to be hydrogenated at positions A1 and A2 located 0.2 L from either side of the cathode support 12c, is not more than $\frac{1}{10}$ of the value of the pressure difference between two arbitrary points at the upper end of the cathode 12, for example the pressure difference $\Delta P_H$ in the mixture of the substance to be hydrogenated and the product at positions B1 and B2 located 0.2 L from either side of the cathode support 12c. If this relationship is not satisfied, then the liquid flow uniformity deteriorates, and localized accumulation of liquid and/or gases occurs, causing a deterioration in the electrolysis performance. Further, when the substance to be hydrogenated is supplied at a rated flow rate, the pressure difference of the mixture inside the cathode chamber 13 is preferably set to not less than 1 kPa/mm. These types of conditions can be achieved by appropriate adjustment of the flow channel cross-sectional area in the height direction inside the cathode chamber 13. For example, when the cathode chamber 13 is a regular square shape, the flow path cross-sectional area at the lower end and the upper end is preferably set to about 10 times the flow channel cross-sectional area for the vertical direction.

Figure 5:
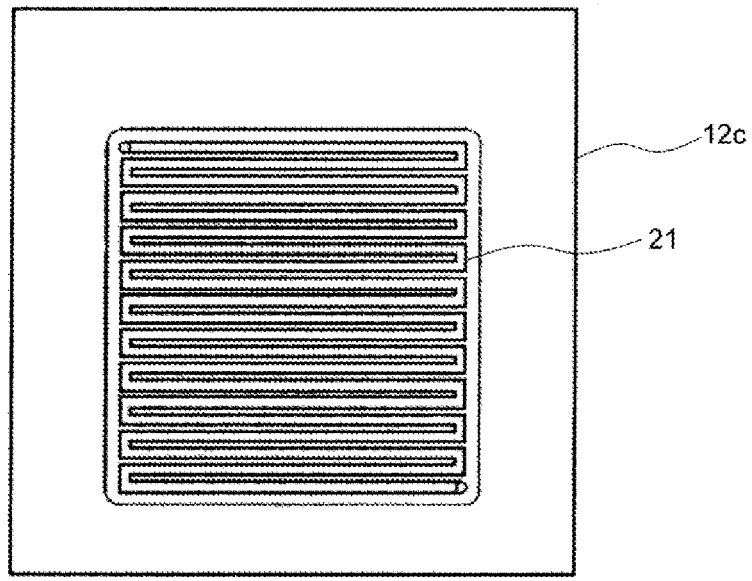
FIG. 5 is a schematic plan view of a cathode support having a serpentine flow channel.
Figure 6:
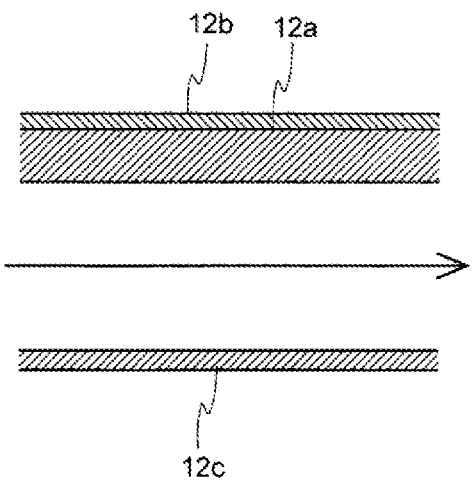
FIG. 6 is a schematic partial cross-sectional view of the cathode chamber of an organic hydride production apparatus having a serpentine flow channel and a cathode support.

FIG. 5 illustrates a schematic plan view of a cathode support having a serpentine flow channel, and FIG. 6 illustrates a schematic partial cross-sectional view of the cathode chamber of an organic hydride production apparatus containing a cathode support with a serpentine flow channel. The arrow in FIG. 6 indicates the flow of the raw material substance to be hydrogenated. In the cathode support 12c having a serpentine flow channel illustrated in FIGS. 5 and 6, if only the serpentine channel 21 is provided, then because structures corresponding with the partitions 12d of FIGS. 3 and 4 do not exist, the liquid tends not to flow into the interior of the cathode substrate 12a, but rather flow in a linear manner, meaning mass transfer through the cathode substrate 12a to the surface of the cathode catalyst layer 12b tends to be insufficient. In an electrolytic cell using this type of cathode support, if the concentration of the raw material substance to be hydrogenated (such as toluene) is high (a molar ratio of 20% or higher), then even at a high current such as a current density of 0.4 A/cm$^2$, only the targeted reaction proceeds.

Figure 7:
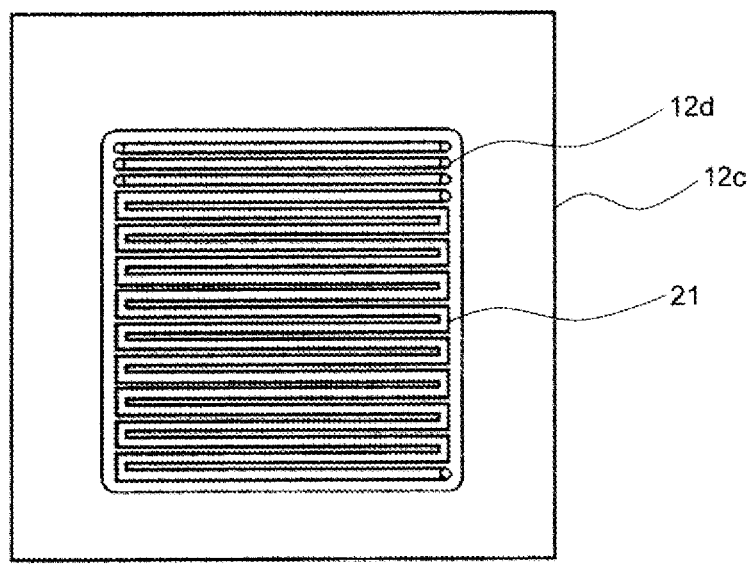
FIG. 7 is a schematic plan view of a cathode support having a serpentine flow channel and provided with a plurality of partitions in the upper 20% of the cathode support.

However, in an operating state where the concentration of the substance to be hydrogenated inside the cathode chamber 13 is decreasing, for example, in the case where the concentration of the substance to be hydrogenated at the outlet from the cathode chamber 13 has decreased to 20% or less, secondary reactions are more likely to proceed. In these types of cases, at least one partition 12d is preferably provided on the cathode support 12c, and it is particularly preferable that a plurality of partitions 12d are formed on the upper portion of the cathode support 12c in such a manner that the area of the portion having the partitions 12d is not more than 20% of the effective projected electrode area. This enables the reaction efficiency to be improved. FIG. 7 illustrates a schematic plan view of a cathode support having a serpentine flow channel and provided with a plurality of partitions in the upper 20% of the cathode support. In this illustrated example, the portion outside the partitions 12d provided on the upper portion of the cathode support 12c represents a channel 21.

[Solid Polymer Electrolyte Membrane]

The electrolyte membrane 11 used in the electrolytic cell of the present invention is preferably formed from a fluororesin material having sulfonic acid groups as ion exchange groups which exhibits excellent long-term stability relative to oxidation reactions and organic compound solvents. The electrolyte membrane 11 is formed from a material (ionomer) having proton conductivity, and allows selective transmission of protons while inhibiting mixing or diffusion of substances between the cathode 12 and the anode 14. The thickness of the electrolyte membrane 11 is preferably from 5 to 300 µm, more preferably from 10 to 200 µm, and most preferably from 20 to 100 µm. If the thickness of the electrolyte membrane 11 is less than 5 µm, then the barrier properties of the electrolyte membrane 11 deteriorate, and cross leakage is more likely to occur. Further, if the thickness of the electrolyte membrane 11 exceeds 300 µm, then the ion transport resistance becomes excessively large, which is also undesirable.

In the electrolytic cell 10 of the present invention, surface roughness may be formed on the surface of the electrolyte membrane 11 to hydrophilize the surface, an inorganic substance layer may be coated onto the surface of the electrolyte membrane 11 to hydrophilize the surface, or a combination of these techniques may be used.

[Cathode]

In the electrolytic cell 10 of the present invention, as illustrated in the drawings, the cathode 12 may be constructed of the cathode substrate 12a and the cathode catalyst layer 12b. Examples of materials that may be used as the cathode substrate 12a, which constitutes part of the cathode 12 of the electrolytic cell 10 of the present invention, include fibrous sintered bodies such as cloth and paper formed from a porous conductive substrate of carbon. The reason for using a porous conductive substrate is because it is preferable to have an appropriate degree of porosity to enable the supply and removal of gases and liquids, while ensuring a satisfactory level of conductivity. Substrates having a thickness of 0.01 to 5 mm, a porosity of 30 to 95% and a representative pore size of 0.001 to 1 mm are particularly preferred. Incorporating a metal component on the surface of this cathode substrate 12a is also preferred, as it improves the conductivity of the overall conductive layer and enables a more uniform current to be achieved.

Carbon cloth is a cloth woven from bundles containing several hundred fine carbon fibers having a diameter of several µm, and is ideal as the cathode substrate 12a due to its excellent gas-liquid permeability. Further, carbon paper is prepared by using a papermaking method to form a thin-film precursor from raw carbon fiber and then sintering the precursor, and this type of carbon paper can also be used favorably. If power is supplied directly to this type of carbon-based conductive substrate, then because of the insufficient conductivity, localized current concentration may occur, and this locally concentrated current may then be supplied to the gas diffusion layer or reaction layer, causing a deterioration in the electrolysis efficiency, but by also incorporating a metal component, current can be supplied more uniformly to the conductive substrate.

[Cathode Catalyst]

Examples of the types of cathode catalysts that can be used include particles of metals selected from among platinum, ruthenium, palladium, iridium, and alloys of these metals. Commercially available particles of these metals may be used, or particles that have been synthesized in accordance with conventional methods may be used. For example, the synthesis may employ either a wet method in which a reducing agent is mixed with an aqueous solution containing dissolved catalyst metal ions to synthesize metal particles, or a dry method that uses deposition or sputtering. The particle size of the cathode catalyst particles is preferably from 0.001 to 1 µm.

Although cathode catalyst particles need not necessarily be supported on the cathode substrate 12a, by using carbon particles as the carrier particles and expanding on these particles, the catalyst surface area can be increased effectively. Carbon microparticles are usually used as the carrier particles, and furnace black or acetylene black or the like can be used. The particle size of the carbon microparticles is preferably from 0.01 to 1 µm. The conductive powder in the reaction layer has a function of suppressing aggregation of the hydrophilic catalyst particles.

[Cathode Production]

There are no particular limitations on the method used for producing the cathode 12. For example, by mixing a catalyst component powder, a hydrophobic resin, water, a solvent such as naphtha, and a dispersion DE521 (manufactured by DuPont Corporation) of the ionomer Nafion (a registered trademark), so that the ratio of the mass following drying relative to the mass of carbon in the catalyst is within a range from 1:10 to 10:1, and then using an appropriate solvent, a coatable catalyst ink can be prepared. Subsequently, this catalyst ink is applied to the cathode substrate 12a, and is then dried and fired to fix the particles of the cathode catalyst to the cathode substrate 12a. The ionomer of the Nafion dispersion is effective in maintaining the electron transfer reaction in the non-conductive organic hydride compound inside the porous structure. The hydrophobic resin (fluorine component) is a gas-permeable material, and the particle size of the hydrophobic resin powder is preferably from 0.005 to 10 µm. The application, drying and firing are preferably repeated multiple times, as this yields a more uniform cathode catalyst layer 12b. In this manner, the cathode 12 having the cathode catalyst layer 12b can be produced.

In the electrolytic cell 10 of the present invention, a catalyst ink component may also be used to form a cathode catalyst layer on the electrolyte membrane 11. A bar coater application method may be used to form a cathode catalyst layer on one surface of the electrolyte membrane 11, thus forming a cathode-electrolyte membrane composite. This catalyst ink is spray coated onto the electrolyte membrane 11 so that the combined mass of Pt and Ru in the catalyst per unit area of the electrode reaches 0.5 mg/cm$^2$, and the solvent component in the ink can then be dried to obtain an electrolyte membrane-catalyst assembly.

The cathode substrate 12a is used with a pressure applied in the thickness direction, and it is undesirable if the conductivity in the thickness direction changes as a result of this pressure. In order to obtain a cathode having improved performance and a packing ratio of 20 to 50%, press working is preferably performed. Press working is performed to enhance the conductivity by compressing the carbon material, and to stabilize any changes in the packing ratio and conductivity when pressure is applied during use. An improvement in the degree of bonding between the cathode catalyst layer 12b and the cathode substrate 12a also contributes to an improvement in the conductivity. Further, as a result of compression of the cathode substrate 12a and the reaction layer, and an improvement in the degree of bonding between the cathode catalyst layer 12b and the cathode substrate 12a, the ability to supply the raw material substance and remove the product substance is also enhanced. Conventional apparatus such as hot presses or hot rollers can be used as the press working apparatus. The press working conditions preferably include a temperature of room temperature to 360° C. and a pressure of 0.1 to 5 MPa. The above procedure enables the production of a cathode 12 having high levels of conductivity and reactivity.

[Anode]

Because the anode substrate that constitutes part of the anode 14 of the electrolytic cell 10 of the present invention must have sufficient electrical conductivity to allow flow of the current required for electrolysis, and also requires adequate mechanical strength to enable fabrication of the electrolytic cell 10, the anode substrate is preferably a plate-like material having a thickness of 0.1 to 2 mm. In order to avoid any increase in resistance caused by gas bubbles generated at the gas-generating electrode, and promote supply of the electrolyte, the anode substrate is preferably a porous body having excellent corrosion resistance relative to acidic electrolytes, and a titanium expanded mesh is frequently used. Because the expanded mesh adopts a three-dimensional structure after mesh processing, the mesh is preferably subjected to an appropriate flattening treatment. The ideal thickness range for the expanded mesh is from 0.1 to 2 mm, and it is preferable that the distance between centers in the short direction is from 0.1 to 4 mm, the distance between centers in the long direction is from 0.1 to 6 mm, and the aperture ratio is about 30 to 70%.

[Production of Anode]

In the production of the anode 14, it is preferable that the surface of the titanium that acts as the anode substrate is subjected to a dry blast treatment, and subsequently subjected to a washing treatment in an aqueous solution of 20% sulfuric acid or the like. Subsequently, an arc ion plating device is used to form a titanium-tantalum layer or the like on the surface of the washed anode 14. This layer suppresses the corrosion of the titanium substrate that tends to proceed during electrolysis. The thickness of the titanium-tantalum layer is preferably from 0.1 to 10 μm. Subsequently, the anode can be produced by performing a plurality of repetitions of an operation in which a mixed aqueous solution prepared by dissolving iridium (Ir) and tantalum components is applied to the anode substrate and a heat treatment is then performed in an electric furnace at 360 to 550° C. For the anode of the electrolytic cell of the present invention, an anode in which an anode catalyst layer composed of iridium oxide and tantalum oxide is formed in an amount equivalent to an Ir metal content per unit area of the electrode of 1 to 40 g/m$^2$ can be used particularly favorably as the anode 14.

[Cell Structure]

In the electrolytic cell 10 of the present invention illustrated in FIG. 1, the partition plate 13a having electron conductivity is disposed at the outer portion of the cathode chamber 13. The partition plate 13a is, for example, formed from a metal such as stainless steel. The spacer 13b is fitted between the peripheral rim of this partition plate 13a and the electrolyte membrane 11, and the space enclosed by the partition plate 13a, the spacer 13b and the electrolyte membrane 11 functions as the cathode chamber 13. The spacer 13b also functions as a sealing material that prevents the substance to be hydrogenated and the organic substance containing the hydride from leaking out of the cathode chamber 13, and preferably has electronic insulating properties. Examples of the material used for the spacer 13b include ethylene tetrafluoride resins.

In the example illustrated in the drawing, the inlet 17 for the substance to be hydrogenated is provided in a lower portion of the spacer 13b, and the substance to be hydrogenated such as toluene is supplied to the cathode chamber 13 through this inlet 17. Further, the hydride outlet 18 is provided in an upper portion of the spacer 13b, and the organic substance containing hydrides such as methylcyclohexane, which is a hydride of toluene, is discharged through this hydride outlet 18.

The partition plate 15a having electron conductivity is disposed at the outer portion of the anode chamber 15 of the electrolytic cell 10 of the present invention. The partition plate 15a is, for example, formed from a metal such as titanium. The spacer 15b is fitted between the peripheral rim on the anode 14 side of this partition plate 15a and the electrolyte membrane 11, and the space enclosed by the partition plate 15a, the spacer 15b at the end portions on the side of the anode chamber 15, and the electrolyte membrane 11 functions as the anode chamber 15. The spacer 15b also functions as a sealing material that prevents the acidic electrolytic solution from leaking out of the anode chamber 15, and preferably has electronic insulating properties. Examples of the material used for the spacer 15b include ethylene tetrafluoride resins.

In the illustrated example, the acidic electrolytic solution inlet 19 is provided in a lower portion of the spacer 15b, and the acidic electrolytic solution is supplied to the anode chamber 15 through this acidic electrolytic solution inlet 19. Examples of the acidic electrolytic solution include solutions of sulfuric acid, phosphoric acid, nitric acid or hydrochloric acid having an ion conductance measured at 20° C. of at least 0.01 S/cm. If the ion conductance of the acidic electrolytic solution is lower than 0.01 S/cm, then an industrially adequate electrochemical reaction is difficult to achieve. Further, an acidic electrolytic solution outlet 20 is provided in an upper portion of the spacer 15b, and the acidic electrolytic solution stored in the anode chamber 15 is discharged from the system through this acidic electrolytic solution outlet 20.

Furthermore, in the illustrated example, the anode-supporting elastic body 14a is disposed between the anode 14 and the partition plate 15a, and the anode 14 is pressed against the electrolyte membrane 11 by the anode-supporting elastic body 14a. The anode-supporting elastic body 14a is, for example, formed form an electronic conductor having a plate spring or coil structure. In the illustrated example, the anode spacer 16 is interposed between the anode 14 and the electrolyte membrane 11, and this anode spacer 16 is structured to maintain a prescribed gap between the anode 14 and the electrolyte membrane 11. In this manner, by employing a structure in which the anode-supporting elastic body 14a is provided between the partition plate 15a and the anode 14 that constitute the anode chamber 15 so as to hold the anode 14, maintenance operations such as replacing the anode 14 can be performed more easily.

The anode-supporting elastic body 14a is preferably formed from a material having acid resistance to the acidic electrolytic solution that is introduced through the acidic electrolytic solution inlet 19, and titanium or a titanium alloy can be used favorably as a base material. Various types of structures may be considered for the structure of the elastic body that constitutes the anode-supporting elastic body 14a, including V-shaped springs, X-cross springs, cushion coils, and an aggregate of fibers produced by chatter vibration cutting. The thickness and the like of the material may be selected as appropriate, with due consideration of the contact resistance of each member, so as to achieve the required contact pressure.

EXAMPLES

The present invention is described below in further detail using a series of examples, but these examples are merely illustrations designed to better describe the present invention, and in no way limit the present invention.

Example 1

The hydrogenation reaction of toluene was evaluated electrochemically by supplying toluene to the cathode side and humidified hydrogen to the anode side of an electrode/membrane assembly produced by bonding noble metal-supporting carbon catalyst layers to both layers of a perfluorocarbonsulfonic acid-based membrane. Because the polarization of the hydrogen oxidation reaction at the anode is extremely small, the anode was deemed to also function as a pseudo reversible hydrogen electrode (RHE) counter electrode, and a carbon paper (35BC, manufactured by SGL Carbon AG) coated with 0.5 mgcm$^{-2}$ of a Pt/C catalyst (TEC10E50E, manufactured by Tanaka Kikinzoku Kogyo K.K.) together with a Nafion solution (DE521, manufactured by DuPont Corporation) was used as the anode, and the carbon paper 35BC coated with 0.5 mgcm$^{-2}$ of a PtRu/C catalyst (TEC61E54E, manufactured by Tanaka Kikinzoku Kogyo K.K.) together with the Nafion solution was used as the cathode. The electrode surface area was 25 cm$^2$. Nafion NRE212CS (manufactured by DuPont Corporation) was used as the electrolyte membrane, and the anode and cathode were bonded to the membrane to form a membrane-electrode assembly.

Humidified hydrogen of 100% RH was supplied to the anode at 100 mLmin$^{-1}$, and TL/MCH (TL concentration: 5%) was circulated through the cathode at 5 mLmin$^{-1}$ using a pump. The cell temperature was set to 60° C., and the polarization was evaluated by Linear Scan Voltammetry (LSV) at 1 mVs$^{-1}$. A cathode support of the type illustrated in FIGS. 2 and 3, provided with 21 parallel partitions of width 1 mm at a pitch of 1 mm covering the entire surface of the cathode support and aligned across the flow direction, was used as the cathode flow channel structure. In the electrolytic cell of Example 1, hydrogen gas generation did not occur until 60 mAcm$^{-2}$. The pressure differences at the cathode inlet and outlet were 0.004 MPa for $\Delta P_L$ and 0.044 MPa for $\Delta P_H$. The structure of the electrolytic cell had the type of structure illustrated in FIG. 1.

Comparative Example 1

Figure 8:
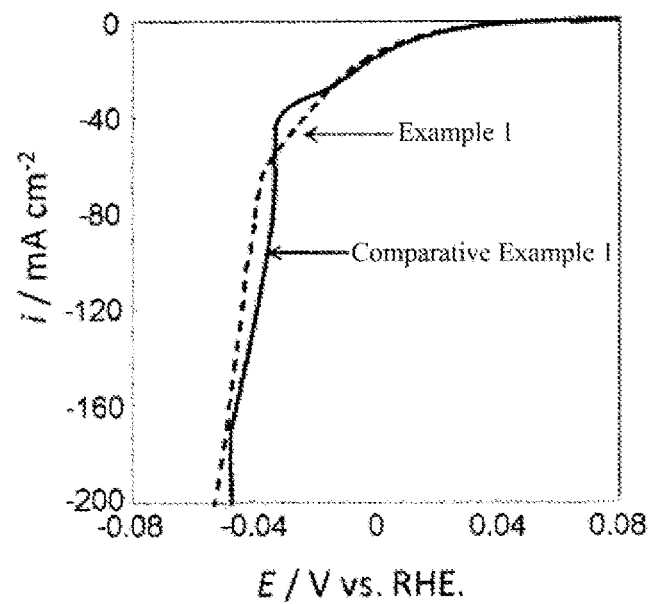
FIG. 8 is a graph illustrating the polarization curves for the current density and the cathode potential of electrolytic cells in Example 1 and Comparative Example 1.

With the exception of using a cathode support having the type of planar structure illustrated in FIG. 5, having a serpentine flow channel with a 1 mm pitch, a similar test to Example 1 was performed. In the serpentine flow channel, hydrogen gas generation started at 40 mAcm$^{-2}$. The pressure difference between the inlet and outlet on the cathode side was substantially 0 MPa. FIG. 8 illustrates the polarization curves for −0.08 V to 0.08 V vs. RHE when 5% toluene was introduced into the electrolytic cell of Example 1 and the electrolytic cell of Comparative Example 1.

Example 2

Figure 9:
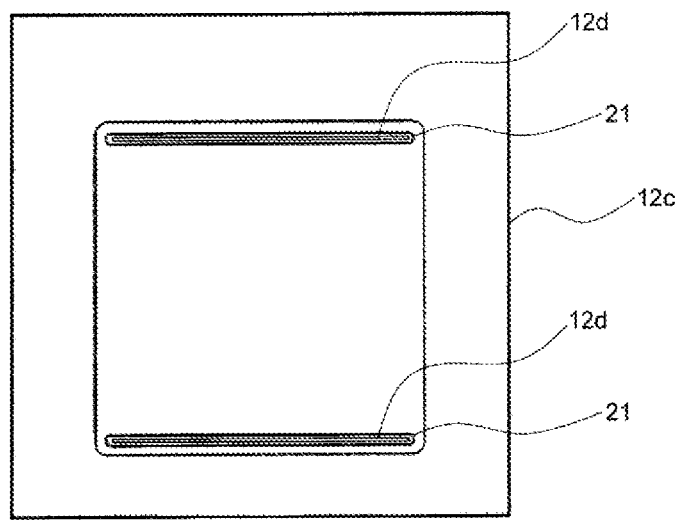
FIG. 9 is a schematic plan view of the cathode support used in Example 2.
Figure 10:
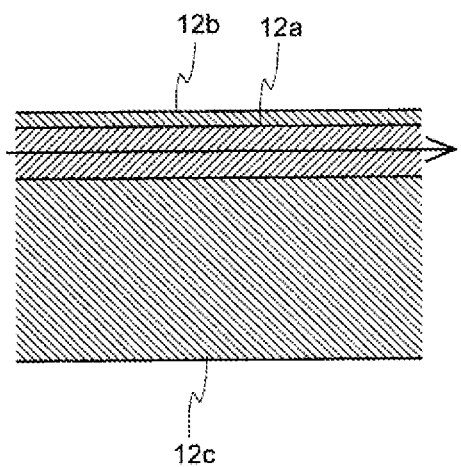
FIG. 10 is a schematic partial cross-sectional view of the cathode chamber of the organic hydride production apparatus used in Example 2.

A cathode support having the type of planar structure illustrated in FIG. 9 was used. The structure of the cathode support 12c included one channel 21 and one 1.5 mm partition 12d of 1.5 mm for the channel 21 at both the top end and the bottom end of the support. With this exception, a similar test to Example 1 was performed. In the serpentine flow channel, hydrogen gas generation did not occur until 60 mAcm$^{-2}$. The pressure differences at the cathode inlet and outlet were 0.004 MPa for $\Delta P_L$ and 0.104 MPa for $\Delta P_H$. FIG. 10 illustrates a schematic partial cross-sectional view of the cathode chamber of the organic hydride production apparatus used in Example 2.

Comparative Example 2

With the exception of conducting the supply of toluene from the upper portion of the cathode chamber, electrolysis was performed in a similar manner to Example 1. In the serpentine flow channel, hydrogen gas generation started at 50 mAcm$^{-2}$. Further, when a current of 100 mAcm$^{-2}$ was passed through the apparatus, the cell voltage increased after 5 minutes and current flow stopped.

Comparative Example 3

Figure 11:
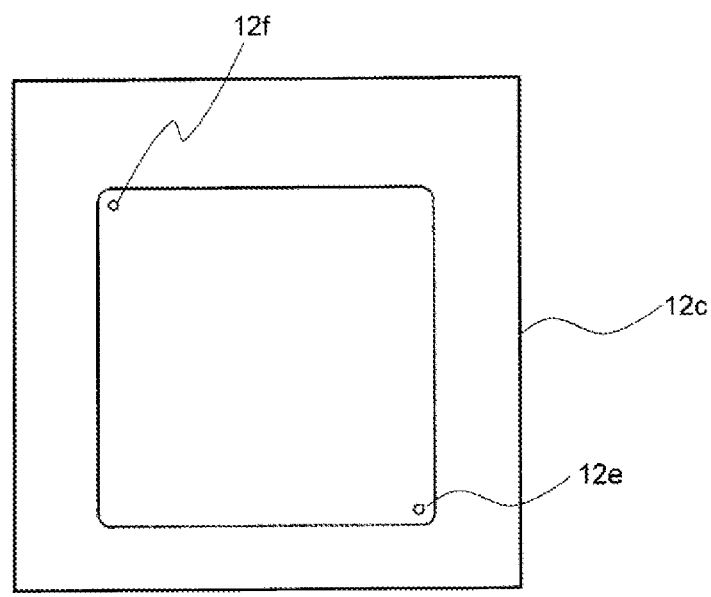
FIG. 11 is a schematic plan view of the cathode support used in Comparative Example 3.

With the exception of using a cathode support having the type of planar structure illustrated in FIG. 11, in which an outlet hole 12f was provided in the top end of a flat cathode support 12c and an inlet hole 12e was provided in the bottom end, thus forming a flow channel through the inside of the carbon paper, a similar test to Example 1 was performed. In this flow channel, hydrogen gas generation occurred at 30 mAcm$^{-2}$.

Example 3

A cathode support 12c having the type of planar structure illustrated in FIG. 7 was used, in which parallel partitions 12d of width 1 mm were provided perpendicular to the flow direction at a pitch of 1 mm in the upper portion of the cathode support equivalent to 14% of the effective projected electrode area of the support. When toluene was supplied from the inlet in the lower portion of the cathode chamber, and electrolysis was conducted so that the toluene concentration at the outlet in the upper portion of the cathode chamber was controlled at 5%, hydrogen gas generation did not occur until 60 mAcm$^{-2}$. The structure of the electrolytic cell had the type of structure illustrated in FIG. 1.

Comparative Example 4

With the exception of using a cathode support on which the partitions 12*d* had not been provided, electrolysis was conducted in the same manner as Example 3, and hydrogen gas generation occurred at 40 mAcm$^{-2}$.

The present invention is in no way limited by the embodiments described above, and all manner of modifications such as design alterations may be implemented based on the knowledge of a person skilled in the art, with the resulting embodiments incorporating these implemented modifications also being included within the scope of the present invention.

DESCRIPTION OF THE REFERENCE SIGNS

10: Organic hydride-producing electrolytic cell (Electrolytic cell)
11: Solid polymer electrolyte membrane (Electrolyte membrane)
12: Cathode
12*a*: Cathode substrate
12*b*: Cathode catalyst layer
12*c*: Cathode support
12*d*: Partition
12*e*: Inlet hole
12*f*: Outlet hole
13: Cathode chamber
13*a*: Partition plate
13*b*: Spacer
14: Electrode catalyst-containing anode (Anode)
14*a*: Anode-supporting elastic body
15: Anode chamber
15*a*: Partition plate
15*b*: Spacer
16: Anode spacer
17: Inlet for substance to be hydrogenated
18: Hydride outlet
19: Acidic electrolytic solution inlet
20: Acidic electrolytic solution outlet
21: Channel

The invention claimed is:

1. An organic hydride production apparatus comprising a solid polymer electrolyte membrane having proton conductivity, a porous cathode which is provided on one surface of the solid polymer electrolyte membrane and generates a hydride by reducing a substance to be hydrogenated, a cathode chamber which houses the porous cathode and is supplied with the substance to be hydrogenated, an electrode catalyst-containing anode which is provided on the other surface of the solid polymer electrolyte membrane and generates protons by oxidizing water, an anode spacer is disposed between the electrode catalyst-containing anode and the solid polymer electrolyte membrane, and an anode chamber which houses the anode and is supplied with an electrolytic solution, wherein the substance to be hydrogenated is supplied from the lower end of the cathode chamber, the production apparatus has a hydride outlet through which a product, unreacted material of the substance to be hydrogenated and by-product hydrogen are discharged from the upper end of the cathode chamber, and at least one partition with a width of 0.1 mm to 1.0 mm is formed inside the cathode chamber, wherein the at least one partition extends horizontally from a cathode support to a cathode substrate, and wherein the at least one partition is in contact with the cathode support and in contact with the cathode substrate, wherein the cathode chamber is formed from an outermost partition plate and a spacer positioned between the peripheral rim of the outermost partition plate and the electrolyte membrane.

2. The organic hydride production apparatus according to claim 1, wherein the partition is formed in at least the upper portion of the cathode chamber, and an area of a portion having the partition is not more than 20% of the effective projected electrode area.

3. The organic hydride production apparatus according to claim 1, wherein the anode chamber is formed from an outermost partition plate and a spacer positioned between the peripheral rim of the outermost partition plate and the electrolyte membrane, wherein an anode-supporting elastic body is disposed between the outermost partition plate and the anode, wherein the anode-supporting elastic body has a structure of X-cross springs.

* * * * *